(12) United States Patent
Lee

(10) Patent No.: US 10,554,902 B2
(45) Date of Patent: Feb. 4, 2020

(54) APPARATUS AND METHOD FOR PROCESSING IMAGES

(71) Applicant: HANWHA TECHWIN CO., LTD., Seongnam-si (KR)

(72) Inventor: Changmin Lee, Seongnam-si (KR)

(73) Assignee: HANWHA TECHWIN CO., LTD., Seongnam-si ( * ) Notice: Subject to any disclaimer, the term of this patent is extended or adjusted under 35 U.S.C. 154(b) by 0 days.

(21) Appl. No.: 15/968,147

(22) Filed: May 1, 2018

(65) Prior Publication Data

US 2019/0342485 A1    Nov. 7, 2019

(51) Int. Cl.
| | |
|---|---|
| *H04N 5/235* | (2006.01) |
| *H04N 5/14* | (2006.01) |
| *H04N 5/232* | (2006.01) |
| *H04N 5/217* | (2011.01) |

(52) U.S. Cl.
CPC ........... *H04N 5/2355* (2013.01); *H04N 5/145* (2013.01); *H04N 5/217* (2013.01); *H04N 5/2353* (2013.01); *H04N 5/23245* (2013.01)

(58) Field of Classification Search
CPC .... H04N 5/2355; H04N 5/217; H04N 5/2353; H04N 5/145; H04N 5/23245
USPC .................................. 348/223.1–229.1, 362
See application file for complete search history.

(56) References Cited

U.S. PATENT DOCUMENTS

| | | | |
|---|---|---|---|
| 9,124,811 B2 | 9/2015 | Lee | |
| 9,251,573 B2 | 2/2016 | Kobayashi | |
| 9,330,446 B2 | 5/2016 | Park | |
| 2012/0002899 A1* | 1/2012 | Orr, IV | G06T 5/50 382/282 |
| 2015/0348242 A1* | 12/2015 | Molgaard | G06T 5/50 348/241 |
| 2016/0065823 A1* | 3/2016 | Katoh | H04N 5/2353 348/366 |
| 2016/0156828 A1* | 6/2016 | Moon | H04N 5/2355 348/222.1 |

FOREIGN PATENT DOCUMENTS

| | | |
|---|---|---|
| KR | 10-2014-0093079 | 7/2014 |
| KR | 10-2014-0111858 | 9/2014 |
| KR | 10-2015-0045877 | 4/2015 |
| KR | 10-2016-0030352 | 3/2016 |

* cited by examiner

*Primary Examiner* — Yogesh K Aggarwal
(74) *Attorney, Agent, or Firm* — H.C. Park & Associates, PLC

(57) ABSTRACT

An apparatus for processing images includes an image sensor to output a long exposure image frame based upon a first exposure time and at least two short exposure image frames having a single, second exposure time different from the first exposure time; a mode determination unit to determine the second exposure time based on the number of saturated pixels in the image frame output from the image sensor; a shutter controller to control the exposure time of each frame of the image sensor based on an output signal from the mode detection unit; and an image processing unit to fuse the long exposure image frame and the at least two short exposure image frames to output a wide dynamic range (WDR) image. Methods for processing WDR images are also disclosed.

20 Claims, 6 Drawing Sheets

APPARATUS AND METHOD FOR PROCESSING IMAGES

BACKGROUND

Field

Exemplary implementations of the invention relate generally to an image processing apparatus and method, and more particularly, to an image processing apparatus and method capable of removing motion artifacts in a wide dynamic range (WDR) image.

Discussion of the Background

Recently, user demand for digital image processing apparatus, such as digital cameras, digital camcorders, and camera phones, is rapidly increasing. Accordingly, digital image processing apparatus has become more sophisticated and have added more diverse functions.

However, conventional digital image processing apparatus do no process all the information about the actual scene because the dynamic range obtainable through the image sensor is relatively small compared with the dynamic range of the actual scene. In particular, when obtaining an image under conditions in which the difference in luminance intensity between a bright portion and a dark portion of an image is large due to back light, it is difficult to obtain sufficient information regarding both the bright portion and the dark portion of the image. Accordingly, the image quality of such an area may be significantly deteriorated. To address this problem, wide dynamic range (WDR) image processing has been developed.

The WDR process enables generation of an image, where both a bright portion and a dark portion of an image are clearly viewable, by fusing a short exposure image and a long exposure image. The exposure time of the short exposure images is adjusted to be short so that a bright portion of an image may be clearly viewed, and the exposure time of the long exposure image is adjusted to be long so that a dark portion of the image may be clearly viewed.

However, when a moving object appears in the actual scene to be captured, motion artifacts may be generated in image generated by the WDR process.

The above information disclosed in this Background section is only for understanding of the background of the inventive concepts, and, therefore, it may contain information that does not constitute prior art.

SUMMARY

Apparatus and methods for processing images constructed according to exemplary implementations of the invention are capable of improving quality of a WDR image by determining whether to obtain a first WDR image maximizing the dynamic range or to obtain a second WDR image in which the motion artifacts are corrected regarding the actual scene captured.

Apparatus and methods for processing images constructed according to exemplary embodiments of the invention are capable of correcting motion artifacts by comparing at least two short exposure image frames having the same exposure time with a long exposure image frame and selecting the image frame based upon which image frame has least the amount of change in motion.

Additional features of the inventive concepts will be set forth in the description which follows, and in part will be apparent from the description, or may be learned by practice of the inventive concepts.

According to one aspect of the invention, an apparatus for processing images includes an image sensor to output a long exposure image frame based upon a first exposure time and at least two short exposure image frames having a single, second exposure time different from the first exposure time; a mode determination unit to determine the second exposure time based on the number of saturated pixels in the image frame output from the image sensor; a shutter controller to control the exposure time of each frame of the image sensor based on an output signal from the mode detection unit; and an image processing unit to fuse the long exposure image frame and the at least two short exposure image frames to output a wide dynamic range (WDR) image.

The image processing unit may includes a motion detection unit to compare a predetermined region of the image frame in the long exposure image frame and each of the at least two short exposure image frames, and to detect a change in motion of an object in the image frames; a frame selection unit to select either the long exposure image frame or the short exposure image frame based upon which image frame has least the amount of change in motion of the object in the predetermined region of the image frame; and a fusing unit to fuse all of the selected image frame regions and output a wide dynamic range (WDR) image.

The frame selection unit may select the predetermined region of the long image frame if the pixels in a predetermined region of the long image frame are not saturated.

The frame selection unit may select the predetermined region of the short exposure image frame based upon which image frame has the least amount of change in motion of the object in the predetermined region of the each short image frames if the pixels in the predetermined region of the long image frame are saturated.

The mode determination unit may include a saturated pixels counter to receive a signal corresponding to the predetermined image frame output from the image sensor, and to count the number of saturated pixels included in the predetermined image frame; a comparator to compare the number of saturated pixels with a predetermined reference value; and a mode decision unit to determine an operation mode of the image processing unit based on an output from the comparator.

The operation mode may include a first operation mode which is employed when the number of saturated pixels is larger than the reference value and a second operation mode which is employed when the number of saturated pixels is smaller than the reference value.

In the second operation mode, the image processing unit may receive a long exposure image frame based upon a first exposure time and three short exposure image frames having a second exposure time smaller than the first exposure time.

The second exposure time may be smaller than the first exposure time.

According to another aspect of the invention, an apparatus for image processing includes an image sensor to output a long exposure image frame based upon a first exposure time and at least two short exposure image frames having a single, second exposure time different from the first exposure time; a motion detection unit to compare a predetermined region of the image frame in the long exposure image frame and each of the at least two short exposure image frames, and to detect a change in motion of an object in the image frames; a frame selection unit to select either the long exposure image frame or the short exposure image frame based upon which image frame has least the amount of change in motion of the object in the predetermined region of the image frame; and a fusing unit to fuse all of the selected image frame regions and output a wide dynamic range (WDR) image.

The frame selection unit may select the predetermined region of the long image frame if the pixels in a predetermined region of the long image frame are not saturated.

The frame selection unit may select the predetermined region of the short exposure image frame based upon which image frame has least the amount of change in motion of the object in the predetermined region of the each short image frames if the pixels in a predetermined region of the long image frame are saturated.

The at least two short exposure image frames may include three short exposure image frames and the second exposure time may be smaller than the first exposure time.

According to still another aspect of the invention, a method for processing images includes the steps of receiving a signal corresponding to a predetermined image frame; counting the number of saturated pixels included in the predetermined image frame; comparing the number of saturated pixels with a predetermined reference value; outputting a long exposure image frame based upon a first exposure time and at least two short exposure image frames having a single, second exposure time different from the first exposure time, when the number of pixels saturated is smaller than the reference value; comparing the predetermined region of the image frame in the long exposure image frame and each of the at least two short exposure image frames, and detecting a change in motion of an object in the image frames; selecting either the long exposure image frame or the short exposure image frame based upon which image frame has least the amount of change in motion of the object in the predetermined region of the image frame; and fusing all of the selected image frame regions and outputting an wide dynamic range (WDR) image.

The step of selecting either the long exposure image frame or the short exposure image frame may include selecting the predetermined region of the long image frame if the pixels in a predetermined region of the long image frame are not saturated.

The step of selecting either the long exposure image frame or the short exposure image frame may include selecting the predetermined region of the short exposure image frame based upon which image frame has least the amount of change in motion of the object in the predetermined region of each of the short image frames if the pixels in a predetermined region of the long image frame are saturated.

The at least two short exposure image frames may include three short exposure image frames and the second exposure time may be smaller than the first exposure time.

The method of processing image may further include the steps of outputting the long exposure image frame based upon the first exposure time and the at least two short exposure image frames having at least two second exposure times different from the first exposure time, when the number of pixels saturated is larger than the reference value.

The at least two short exposure image frames may include three short exposure image frames having three different second exposure times smaller than the first exposure time.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1A:
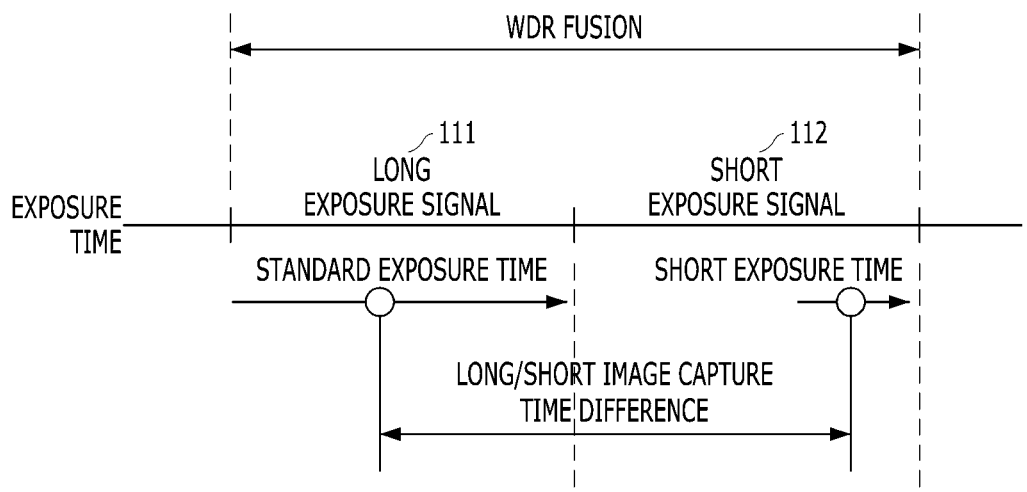
FIGS. 1A and 1B are schematic diagrams illustrating motion artifacts generated in the WDR process.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, a server, and/or one or more components thereof may include or otherwise be associated with one or more memories (not shown) including code (e.g., instructions) configured to cause a server, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Although performance of image processing apparatus, such as digital cameras, is continuously being improved, loss of information of a bright area or a dark area is caused in a charge coupled device (CCD) or complementary metal oxide semiconductor (CMOS) sensor of the related art, used in obtaining an image, due to the limitation in a dynamic range. A dynamic area refers to a ratio of luminance between the brightest area and the darkest area of an image. Because the dynamic area of a sensor used in an image obtaining apparatus is very small compared to the dynamic range if an actual scene, a brightness range of the actual scene may not be expressed completely.

Figure 1B:
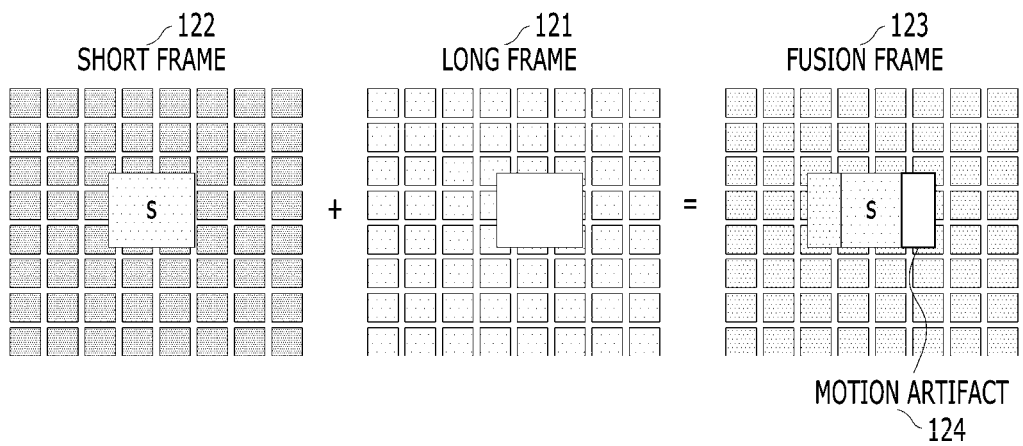

FIGS. 1A and 1B are schematic diagrams illustrating motion artifacts generated in the WDR process.

FIG. 1A illustrates an operation to sense a long exposure image and a short exposure image by using a long/short variable exposure method according to a WDR process known in the art. FIG. 1B illustrates motion artifacts generated in the WDR process.

Referring to FIG. 1A, according to the long/short variable exposure method, a shutter is controlled by selectively adjusting the exposure time for each frame, thereby obtaining a long exposure image and a short exposure image, which are required for the WDR process.

A long exposure signal 111 is obtained during a standard exposure time applied when photographing a frame with an image sensor. One long frame 121 (see FIG. 1B) may be generated based on the long exposure signal 111. A short exposure signal 112 is obtained during an exposure time that is relatively short with respect to the standard exposure time. A short frame 122 (see FIG. 1B) may be generated based on the short exposure signal 112.

When a long frame 121 and a short frame 122 are alternately obtained by using the long/short variable exposure method illustrated in FIG. 1A, motion artifacts 124 may be generated in a fusion frame 123, in which a long exposure image and a short exposure image are fused as is known in the art. The motion artifacts 124 in the fusion frame 123 are caused by changes in the scene that occur due to the time difference between an image capturing time of the long frame 121 and an image capturing time of the short frame 122. In particular, motion artifacts occur more often when a fast-moving object is included in scene to be imaged.

According to the principles of the invention, to improve image quality it is necessary to determine whether to obtain a first WDR image maximizing the dynamic range or to obtain the second WDR image in which the motion artifacts are corrected, based upon the state of the actual scene captured.

Figure 2A:
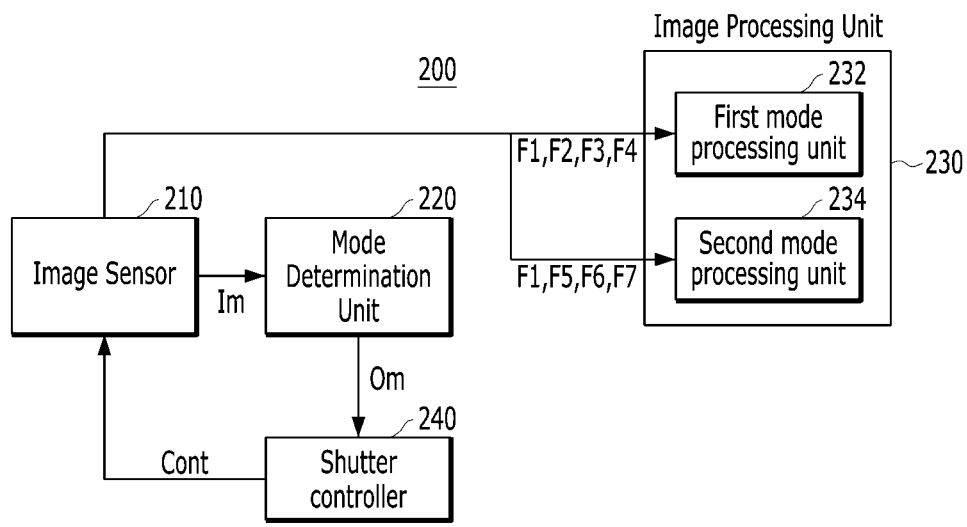
FIG. 2A is block diagram of an image processing apparatus constructed according to an exemplary embodiment of the invention.
Figure 2B:
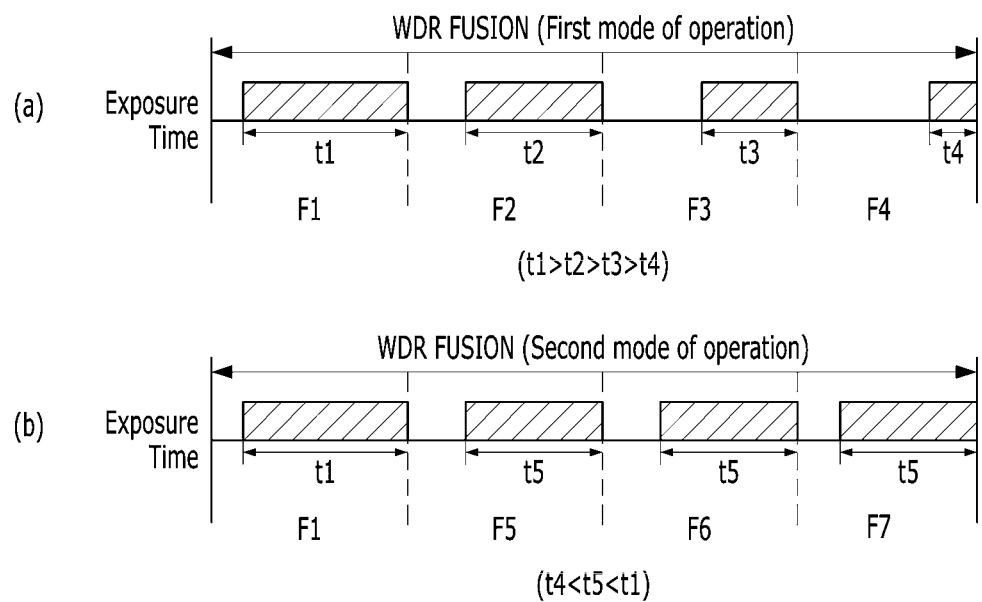
FIG. 2B is a schematic diagram illustrating the exposure time of a long image frame and a short image frames output from the image sensor shown in FIG. 2A in two operational modes.
Figure 3:
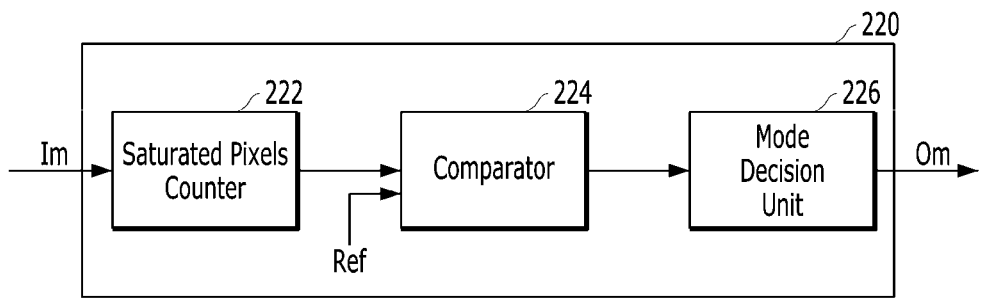
FIG. 3 is a block diagram of the mode determination unit shown in FIG. 2A.
Figure 4:
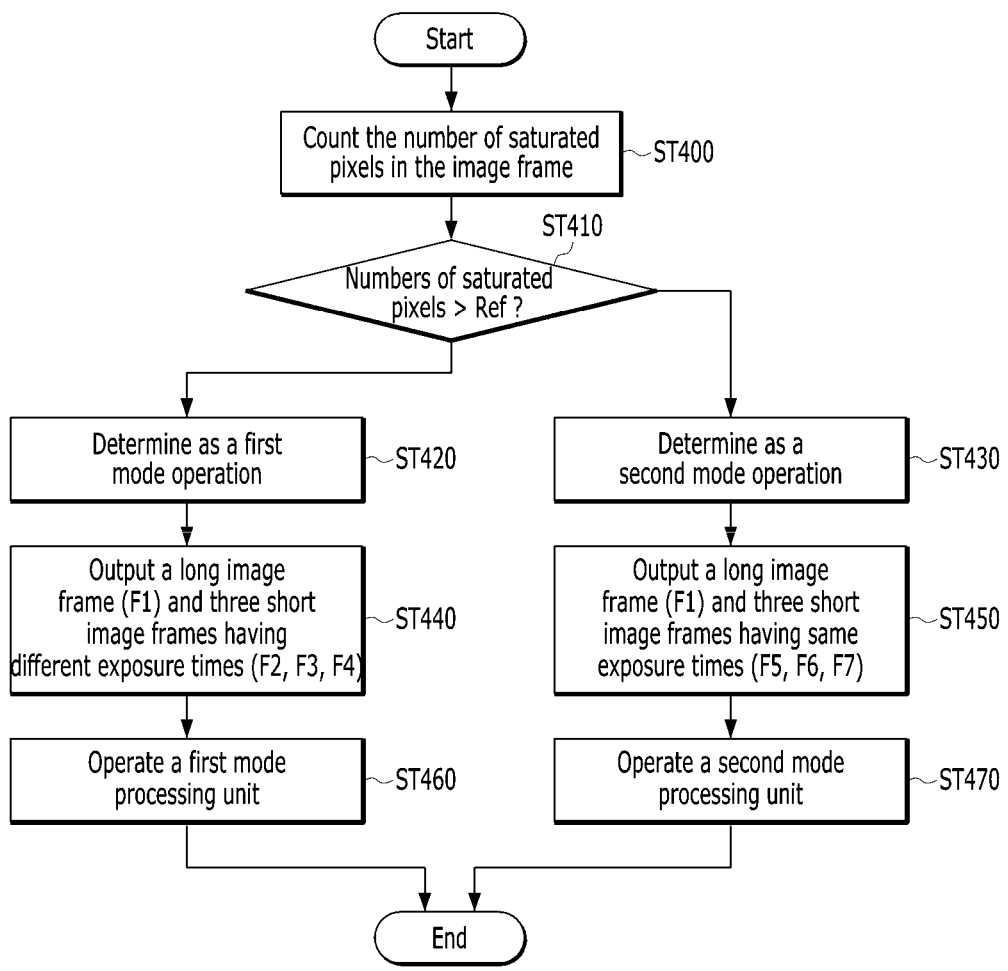
FIG. 4 is a flowchart for illustrating an image processing method according to an exemplary embodiment of the invention.

FIG. 2A is block diagram of an image processing apparatus constructed according to an exemplary embodiment of the invention. FIG. 2B is a schematic diagram illustrating the exposure time of a long image frame and a short image frames output from the image sensor shown in FIG. 2A in two operation modes. FIG. 3 is a block diagram of the mode determination unit shown in FIG. 2A. Also, FIG. 4 is a flowchart for illustrating an image processing method according to an exemplary embodiment of the invention.

Hereinafter, apparatus and method for processing image according to an embodiment of the invention will be described with reference to FIG. 2 to FIG. 4.

Referring to FIG. 2A, an image processing apparatus 200 according to an exemplary embodiment may include an image sensor 210, a mode determination unit 220, a shutter controller 240, and an image processing unit 230.

The image sensor 210 may be any sensor known in the art as discussed in more detail below that can convert an optical signal obtained by a camera into an electric signal. The image sensor 210 may have two modes of operation. In either mode, the sensor 210 outputs a long image frame having a predetermined exposure time and a plurality of short image frames having a different exposure time from the long image frame. The long image frame may be a long exposure image (the 'long frame' F1 as shown in FIG. 2B (a) or (b)) and the second image may be a short exposure image (the 'short frames' F2-F4 as shown in FIG. 2B (a) or the short frames F5-F7 shown in FIG. 2B (b)). As explained below, in FIG. 2B (a), short frames F2-F4 have different, decreasing exposures times, all of which are shorter than the exposure time of F1. In FIG. 2B (b), short frames F5-F7 have the same exposures time, which is shorter than the exposure time of F1.

Here, if the exposure time is long, the amount of light accumulated in the image sensor increases, so that the ability of gradation expression in the dark portion is enhanced, but the bright region becomes saturated and gradation expression may be insufficient. On the other hand, if the exposure time is shortened, the amount of accumulated light becomes small, so that the ability of gradation expression of the bright portion is enhanced, but the gradation of the dark region becomes saturated and gradation expression may be insufficient.

The image sensor 110 may be a charge coupled device (CCD) or a complementary metal oxide semiconductor image sensor (CMOS), or another image capture device known in the art. The CMOS image sensor has low power consumption for capturing images, which is a great advantage in maintaining the power of a battery powered surveillance camera. In addition, the manufacturing cost is relatively low, which is advantageous in making the image capture area of the imaging device large. Also, a CCD image sensor may be used. Its advantages include less noise generation than that of the CMOS image sensor, and the image information transfer speed is very fast, and image quality is excellent.

As noted above, the plurality of short image frames may have different exposure times each other or all have the same exposure time.

FIG. 2B (a) shows three short image frames (F2, F3, F4) having different exposure times (t2, t3, t4), and FIG. 2B (b) shows another three short image frames (F5, F6, F7) having the same exposure time (t5). The exposure times (t2, t3, t4) of the short image frames as shown in FIG. 2B (a) is shorter than the exposure time (t1) of the long image frame (F1). Also, the exposure time (t5) of the short image frames as shown in FIG. 2B (b) is shorter than the exposure time (t1) of the long image frame (F1). Specifically, the exposure time (t5) of the short image frames (F5, F6, F7) can be selected within the range from the shortest exposure time (t4) to the longest exposure time (t1). For example, the exposure time (t5) of the short image frames (F5, F6, F7) can be selected same as the second longest exposure time (t2). Even though FIG. 2 illustrates three short image frames for illustrative purposes, the number of the short image frames is not limited thereto.

In this case, if the short image frames (F2, F3, F4) have different exposure times (t2, t3, t4) as shown in FIG. 2B (a), the ability of gradation expression of the pixels of the image sensor can be maximized, so that a better enhanced dynamic range can be secured when fusing the long image frame and the short image frames. On the other hand, if the short image frames (F5, F6, F7) have the same exposure time (t5) as shown in FIG. 2B (b), image degradation caused when the long image frame and the short image frames are fused can be minimized.

Accordingly, when it is desired to obtain a first WDR image maximizing the dynamic range, that is in the case of the first mode of operation, the image sensor 210 may output the three short image frames (F2, F3, F4) having different exposure times (t2, t3, t4) as shown in FIG. 2B (a). On the other hand, when it is desired to obtain a second WDR image compensating the motion artifacts, that is in the case of the second mode of operation, the image sensor 201 may output the three short image frames (F5, F6, F7) having same exposure time (t5) as shown in FIG. 2B (b).

The mode determination unit 220 may determine either the first mode of operation or the second mode of operation by counting the number of saturated pixels included in a predetermined image frame output from the image sensor 210 and comparing the number of saturated pixels with a predetermined reference value.

More specifically, referring to FIG. 3, the mode determination unit 220 may include a saturated pixels counter 222, a comparator 224, and a mode decision unit 226.

The saturated pixels counter 222 may receive a signal Im corresponding to the predetermined image frame output from the image sensor 210 and may count the number of saturated pixels included in the predetermined image frame (ST 400). At this time, the predetermined image frame is preferably selected from the short image frames, and it is preferable to select a short image frame having the longest exposure time of the short image frames (e.g., F2 shown in FIG. 2B (a) or F5 shown in FIG. 2B (b)). However, the exemplary embodiments are not limited thereto.

Referring to FIGS. 3 and 4, the comparator 224 may compare the number of saturated pixels with a predetermined reference value (Ref) and may output the result to the mode decision unit. (ST 410). The reference value may be changed according to the preferences of the user.

The mode decision unit 226 may determine to operate the image processing unit 230 in the first mode of operation by determining that the ability of gradation expression of the pixels of the image sensor should be increased when the number of pixels saturated is larger than the reference value (ST 420). On the other hand, when the number of pixels saturated is smaller than the reference value, the mode decision unit 226 may determine to operate the image processing unit 230 in the second mode of operation for correcting the motion artifacts instead of increasing the ability of gradation expression (ST 430).

A signal output Om from the mode decision unit 226, that is, an output signal of the mode determination unit 220, may be input to the shutter controller 240, as shown in FIG. 2A. The shutter controller 240 may output a control signal Cont to the image sensor 210 to control the shutter speed of the image sensor 210 based on the output signal Om of the mode determination unit 220. That is, the exposure times (t1, t2, t3, t4) of the first and short image frames output from the image sensor 210 may be determined by the control of the shutter controller 240. For example, if the mode determination unit 220 determines that the first mode of operation is to be performed, the image sensor 210 may output the single long image frame (F1) and the three short image frames (F2, F3, F4) having different exposure times (t2, t3, t4) under the control of the shutter controller 240 (ST 440). In the same manner, when the mode determination unit 220 determines that the second mode of operation is to be performed, the image sensor 210 may output the single long image frame (F1) and the three short image frames (F5, F6, F7) having same exposure time (t5) under the control of the shutter controller 240 (ST 450).

In either mode, the image processing unit 230 may receive the long image frame and the short image frames output from the image sensor 210 and may fuse the long image frame and the short image frames. Specifically, the image processing unit 230 may include a first mode processing unit 232 to perform the first mode of operation and a second mode processing unit 234 to perform the second mode of operation. In this case, the first mode processing unit 232 and the second mode processing unit 234 are distinguished from each other in terms of their operations, so that they need not be physically separated modules as shown in FIG. 2A, but may be integrated in a single component.

The first mode processing unit 232 may receive the three short image frames (F2, F3, F4) having different exposure times (t2, t3, t4) and a long image frame having a long exposure time (t1), and then fuse the long image frame and the short image frames to output a better enhanced WDR image signal (ST 460).

On the other hand, the second mode processing unit 234 may receive the three short image frames (F5, F6, F7) having the same exposure time (t5) and the long image frame having the long exposure time (t1), and compare each of the short image frames with a long image frame, then select a short image frame based on which image frame has least the amount of change in motion of the object (i.e., least motion artifacts) and then fuse the long image frame and the short image frame to output a WDR signal having compensated image deterioration during motion artifact correction (ST 470).

In this case, each of the mode determination unit 220, the image processing unit 230, and the shutter controller 240 may include any type of device that may process data, for example, a processor. The term 'processor' refers to a data processing device embedded in hardware and having physical circuitry to carry out codes or instructions of a program. Examples of the data processing device embedded in the hardware may include, but not limited to, a microprocessor, a central processing unit (CPU), a processor core, a multi-processor, an application-specific integrated circuit (ASIC), a field programmable gate array (FPGA) and other known or later developed processing units. Also, each of the mode determination unit 220, the image processing unit 230, and the shutter controller 240 may be implemented as one physical chip or one or more chips according to function and/or design. However, exemplary embodiments are not limited thereto.

Hereinafter, the configuration and operation of the second mode processing unit according to the exemplary embodiment of the invention will be described in more detail with reference to FIG. 5 to FIG. 7.

Figure 5:
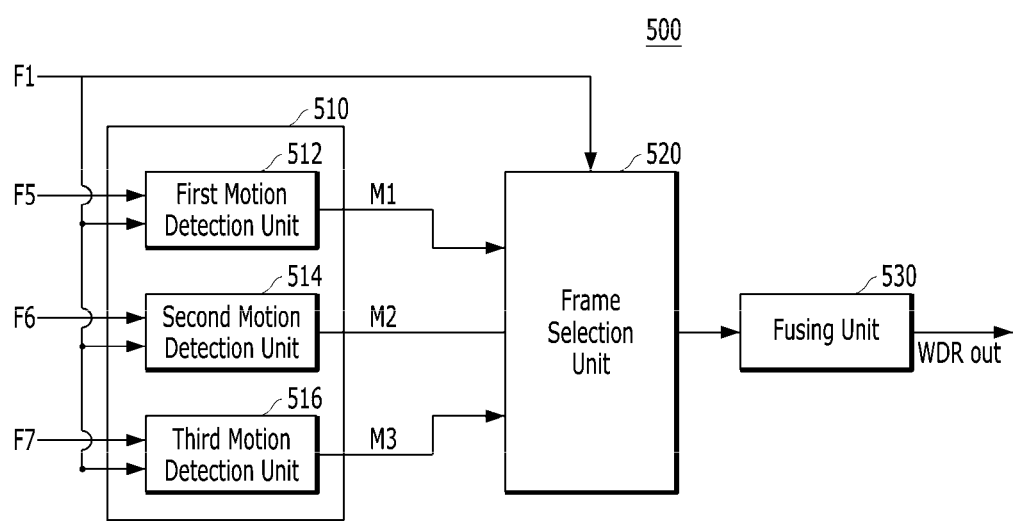
FIG. 5 is block diagram showing internal components of an exemplary embodiment of the second mode processing unit shown in FIG. 2A.

FIG. 5 is block diagram showing internal components of an exemplary embodiment of a second mode processing unit shown in FIG. 2A. FIG. 6 is a flowchart for illustrating an exemplary image processing method carried out by the second mode processing shown in FIG. 5. FIG. 7 is a schematic diagram illustrating a process to fuse blocks of image frames according to the second mode processing unit shown in FIG. 5.

Referring to FIG. 5, the second mode processing unit 500 may includes a motion detection unit 510, a frame selection unit 520, and a fusing unit 530.

The motion detection unit 510 may receive the three short image frames (F5, F6, F7) having the same exposure time (t5) and the long image frame having the long exposure time (t1). Specifically, the motion detection unit 510 may include a first motion detection unit 512 that receives a fifth image frame (F5) and the long image frame (F1) and detects change in motion of the object in the fifth image frame (F5), a second motion detection unit 514 that receives the sixth image frame (F6) and the long image frame (F1) and detects change in motion of the object in the sixth image frame (F6), and a third motion detection unit 516 that receives the seventh image frame (F7) and the long image frame (F1) and detects change in motion of the object in the seventh image frame (F7).

To be more specific, the first motion detection unit 512 may compare a predetermined region of the image frame in the long image frame (F1) and the fifth image frame (F5), and may detect a change in motion of the object in the image frame. In the same manner, the second motion detection unit 514 may compare a predetermined region of the image frame in the long image frame (F1) and the sixth image frame (F6), and may detect a change in motion of the object in the image frame. The third motion detection unit 516 may compare a predetermined region of the image frame in the long image frame (F1) and the seventh image frame (F7), and may detect a change in motion of the object in the image frame.

The predetermined region of the image frame may be a block region including at least one pixel. For example, the entire area of the image frame may be divided into a plurality of blocks, and the first, second and third motion detection units 512, 514, 516 may compare the long image frame and each of the corresponding short image frames (F5, F6, F7) for each of the block regions, so that it is able to detect a motion change in the each block region. The block region may include only one pixel or a plurality of pixels (e.g., 13×13 pixels).

For example, in the case that the each block region has a plurality of pixels, the first, second and third motion detection units 512, 514, 516 may detect change in motion in each block regions by calculating the difference after performing normalization. The normalization may be performed by multiplying the gain according to the exposure ratio with respect to the image corresponding to each block region. However, the exemplary embodiments are not limited thereto.

The frame selection unit 520 may receive the long image frame (F1) and the output signals M1, M2, and M3 of the first, second, and third motion detection units 512, 514, and 516, and may select either the corresponding block region of the short image frame having the least amount of change in motion of the object or the corresponding block region of the long image frame.

Specifically, if the pixels in a predetermined block region of the long image frame are not saturated, the frame selection unit 520 may select a predetermined block region of the long image frame regardless of the result of the motion detection unit 510.

On the other hand, if the pixels in the block region of the long image frame are saturated, the frame selection unit 520 may receive the output signals M1, M2, and M3 of the first, second, and third motion detection units 512, 514, and 516, and may select the corresponding block region of the short image frame having the least amount of change in motion of the object.

The fusing unit 530 may output a wide dynamic range (WDR) image by fusing all selected block regions through the frame selection unit 520.

In another exemplary embodiment, the block region may be composed of only one pixel. In this case, the output signals M1, M2, and M3 of the first, second, and third motion detection units 512, 514, 516 may be classified as those in which change in motion is detected in the corresponding pixel and those in which no change in motion is detected in the corresponding pixel. For example, when the output signals M1, M2, and M3 of the first, second, and third motion detection units 512, 514, 516 are "0", the change in motion may be regarded as being detected, and when the output signals M1, M2, and M3 of the first, second, and third motion detection units 512, 514, 516 are "1", the change in motion may be regarded as not being detected.

Figure 6:
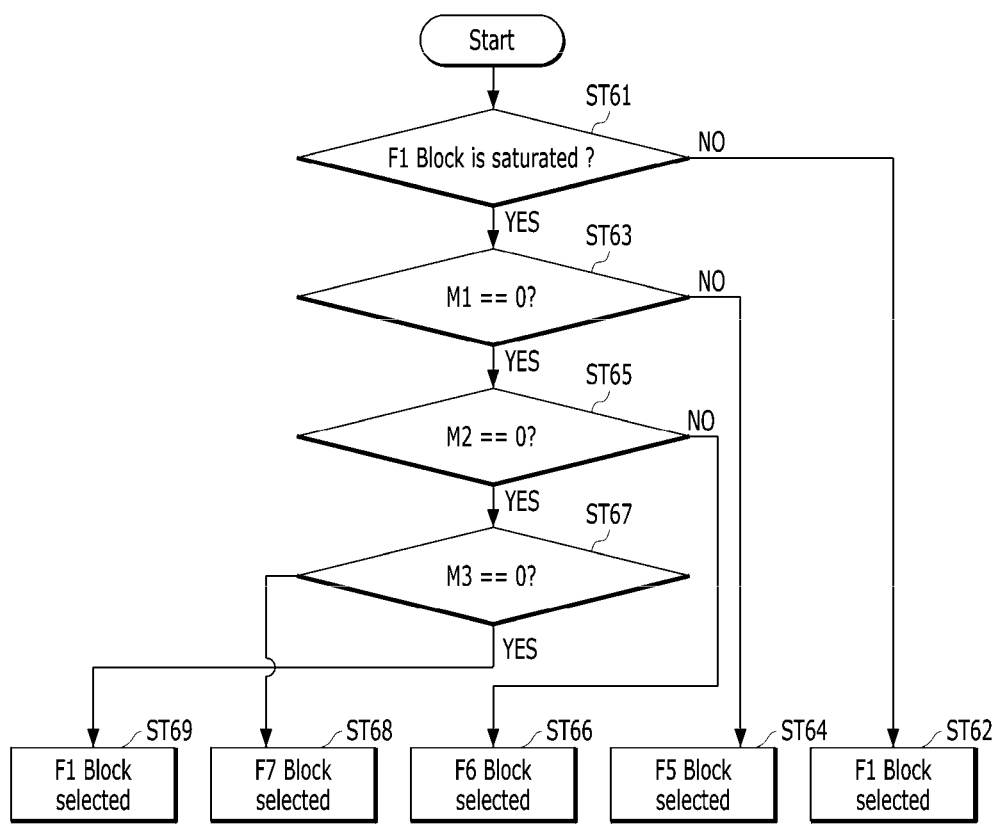
FIG. 6 is a flowchart for illustrating an exemplary image processing method carried out by the second mode processing unit shown in FIG. 5.

FIG. 6 is a flowchart illustrating an example of a method of image processing by the frame selecting unit 520 and the fusing unit 530 of the second mode processing unit 500 when the block is composed of one pixel. However, this is for convenience of explanation, and the exemplary embodiments are not limited thereto. For example, the block may include a plurality of pixels.

Referring to FIGS. 5 and 6, first, the frame selection unit 520 may determine whether a pixel corresponding to a block of the long image frame (F1) is saturated (ST 61). If the pixel is not saturated, a block of the long image frame (F1) is selected regardless of the result of the motion detecting unit (ST 62).

On the other hand, when the pixel corresponding to the block of the long image frame (F1) is saturated, the frame selection unit 520 may determine whether the output signal M1 of the first motion detection unit 512 is "0" or "1" (ST 63). If the output signal M1 of the first motion detection unit 512 is "1", not "0", it means that no change in motion is detected. Therefore, a block of the fifth image frame (F5) is selected (ST 64).

Next, when the output signal M2 of the first motion detection unit 512 is "0", it means change in motion is detected. Thus, the frame selection unit 520 may determine whether the output signal M2 of the second motion detection unit 514 is "0" or "1" (ST 65). If the output signal M2 of the second motion detection unit 514 is "1", not "0", it means that no change in motion is detected. Therefore, a block of the sixth image frame (F6) is selected (ST 66).

Next, when the output signal M2 of the second motion detection unit 514 is "0", it means change in motion is detected. Thus, the frame selection unit 520 may determine whether the output signal M3 of the third motion detection unit 516 is "0" or "1" (ST 67). If the output signal M3 of the third motion detection unit 516 is "1", not "0", it means that no change in motion is detected. Therefore, a block of the seventh image frame (F7) is selected (ST 68).

On the other hand, if the output signal M3 of the third motion detection unit 516 is "0", it means change in motion is detected. Accordingly, the frame selection unit 520 may select a block of the long image frame (F1) because the change in motion has been detected in all of the blocks of the short image frames (F5, F6, F7).

Figure 7:
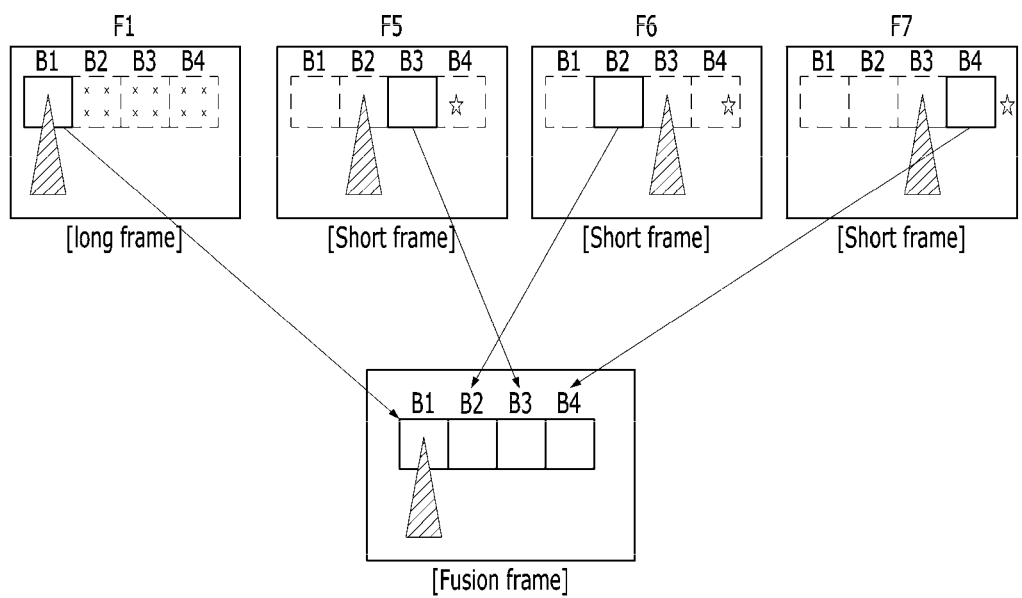
FIG. 7 is a schematic diagram illustrating a process to fuse blocks of image frames according to the second mode processing unit shown in FIG. 5.

FIG. 7 shows that a fusing process of blocks of image frames according to the second mode processing shown in FIG. 5.

Referring to FIGS. 5 to 7, it is assumed that a triangular object moves from left to right and a new object designated as a star appears in the actual scene captured by photographing the image to generate a motion artifact. When, in fusing image frames to form a fusion frame for the several blocks, such as first to fourth blocks (B1, B2, B3, B4), the frame selection unit 520 may select a first block (B1) of the long image frame (F1) and the blocks (B3, B4, B2) of the short image frames (F5, F6, F7), which do not detect any change in motion. For example, a third block (B3) of the fifth image frame (F5), a second block (B2) of the sixth image frame (F6), and a fourth block (B4) of the seventh frame (F7) can be selected as shown in FIG. 7.

Specifically, for example, it is assumed that the pixels in the first block (B1) of the long image frame (F1) are not saturated, but the second to fourth blocks (B2, B3, B4) are saturated.

With respect to the first block (B1), the first block (B1) of the long image frame (F1) is selected regardless of the result of the motion detecting unit because the first block (B1) of the long image frame (F1) are not saturated.

With respect to the second block (B2), the second block (B2) of the sixth image frame (F6) is selected because the second block (B2) of the long image frame (F1) is saturated and a change in motion is detected in the second block (B1) of the fifth image frame (F5).

With respect to the third block (B3), the third block (B3) of the fifth image frame (F5) is selected because the third block (B3) of the long image frame (F1) is saturated and no change in motion is detected in the third block (B3) of the fifth image frame (F5).

With respect to the fourth block (B4), the fourth block (B4) of the seventh image frame (F7) is selected because the fourth block (B4) of the long image frame (F1) is saturated and a change in motion is detected in the fourth block (B4) of the fifth and sixth image frames (F5, F6).

Furthermore, in the exemplary embodiments of the invention, since the exposure time (t2) of the short image frames (F2_1, F2_2, F2_3) are the same, the image processing apparatus can output the WDR image signal minimizing image deterioration during the motion artifact correction. For example, since the exposure time of the plurality of short exposure image frames is the same, it is possible to prevent image deterioration due to a difference in brightness among the blocks in the different image frames in fusion processing.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An apparatus for processing images comprising:
   an image sensor to output a long exposure image frame based upon a first exposure time and at least two short exposure image frames having a single, second exposure time different from the first exposure time;
   a first processor to determine the second exposure time based on a number of saturated pixels in the long exposure image frame or one of the at least two short exposure image frames output from the image sensor;
   a shutter controller to control the exposure time of each frame of the image sensor based on an output signal from the first processor; and
   an image processor to fuse the long exposure image frame and the at least two short exposure image frames to output a wide dynamic range (WDR) image.

2. The apparatus of claim 1, wherein the image processor comprises:
   a motion detector to compare a predetermined region of the image frame in the long exposure image frame and each of the at least two short exposure image frames, and detect a change in motion of an object in the image frames;
   a frame selector to select either the long exposure image frame or the short exposure image frame based upon which image frame has least an amount of change in motion of the object in the predetermined region of the image frame; and
   a fusing controller to fuse all of the selected image frame regions and output a wide dynamic range (WDR) image.

3. The apparatus of claim 2, wherein the frame selector selects the predetermined region of the long image frame if pixels in a predetermined region of the long image frame are not saturated.

4. The apparatus of claim 2, wherein the frame selector selects the predetermined region of the short exposure image frame based upon which image frame has the least amount of change in motion of the object in the predetermined region of the each short image frame if pixels in the predetermined region of the long image frame are saturated.

5. The apparatus of claim 1, wherein the first processor comprises:
   a saturated pixels counter to receive a signal corresponding to a predetermined image frame output from the image sensor, and to count the number of saturated pixels included in the predetermined image frame;
   a comparator to compare the number of saturated pixels with a predetermined reference value; and
   a mode decision controller to determine an operation mode of the image processing unit based on an output from the comparator.

6. The apparatus of claim 5, wherein the operation mode includes a first operation mode which is employed when the number of saturated pixels is larger than the reference value and a second operation mode which is employed when the number of saturated pixels is smaller than the predetermined reference value.

7. The apparatus of claim 6, wherein, in the second operation mode, the image processor receives a long exposure image frame based upon a first exposure time and three short exposure image frames having a second exposure time smaller than the first exposure time.

8. The apparatus of claim 1, wherein the second exposure time is smaller than the first exposure time.

9. An apparatus for processing image comprising:
   an image sensor to output a long exposure image frame based upon a first exposure time and at least two short exposure image frames having a single, second exposure time different from the first exposure time;
   a motion detector to compare a predetermined region of the image frame in the long exposure image frame and each of the at least two short exposure image frames, and to detect a change in motion of an object in the image frames;
   a frame selector to select either the long exposure image frame or the short exposure image frame based upon which image frame has least an amount of change in motion of the object in the predetermined region of the image frame; and a fusing controller to fuse all of the selected image frame regions and output a wide dynamic range (WDR) image.

10. The apparatus of claim 9, wherein the frame selector selects the predetermined region of the long image frame if pixels in a predetermined region of the long image frame are not saturated.

11. The apparatus of claim 9, wherein the frame selector selects the predetermined region of the short exposure image frame based upon which image frame has least the amount of change in motion of the object in the predetermined region of the each short image frame if pixels in a predetermined region of the long image frame are saturated.

12. The apparatus of claim 9, wherein the at least two short exposure image frames comprises three short exposure image frames.

13. The apparatus of claim 9, wherein the second exposure time is smaller than the first exposure time.

14. A method for processing images comprising the steps of:
receiving a signal corresponding to a predetermined image frame;
counting a number of saturated pixels included in the predetermined image frame;
comparing the number of saturated pixels with a predetermined reference value;
outputting a long exposure image frame based upon a first exposure time and at least two short exposure image frames having a single, second exposure time different from the first exposure time, when the number of pixels saturated is smaller than the predetermined reference value;
comparing a predetermined region of the image frame in the long exposure image frame and each of the at least two short exposure image frames, and detecting a change in motion of an object in the image frames;
selecting either the long exposure image frame or the short exposure image frame based upon which image frame has least an amount of change in motion of the object in the predetermined region of the image frame; and
fusing all of the selected image frame regions and outputting a wide dynamic range (WDR) image.

15. The method of claim 14, wherein the step of selecting either the long exposure image frame or the short exposure image frame comprises:
selecting the predetermined region of the long image frame if pixels in the predetermined region of the long image frame are not saturated.

16. The method of claim 14, wherein the step of selecting either the long exposure image frame or the short exposure image frame comprises:
selecting the predetermined region of the short exposure image frame based upon which image frame has least the amount of change in motion of the object in the predetermined region of each of the short image frames if the pixels in the predetermined region of the long image frame are saturated.

17. The method of claim 14, wherein the at least two short exposure image frames comprises three short exposure image frames.

18. The apparatus of claim 14, wherein the second exposure time is smaller than the first exposure time.

19. The apparatus of claim 14, further comprising the step of outputting the long exposure image frame based upon the first exposure time and the at least two short exposure image frames having at least two second exposure times different from the first exposure time, when the number of pixels saturated is larger than the predetermined reference value.

20. The apparatus of claim 19, wherein the at least two short exposure image frames comprises three short exposure image frames having three different second exposure times smaller than the first exposure time.

* * * * *